Patented June 25, 1940

2,205,427

UNITED STATES PATENT OFFICE 2,205,427

PHENOL-UREA RESIN AND METHOD OF MAKING SAME

Karl Loos, Lancaster, Pa.

No Drawing. Application March 13, 1937,
Serial No. 130,786

27 Claims. (Cl. 260—45)

My invention relates to synthetic resins and more particularly to resins of the insoluble and infusible type composed of phenol, urea and formaldehyde.

The present application is a continuation-in-part of my copending application, Ser. No. 675,095, filed June 9, 1933.

The present invention has for its general object the production of a synthetic resin from a phenol, urea, and formaldehyde or their equivalents, under such conditions that a water-clear or colored transparent material, or translucent or opaque material of stable character and good machinability is obtained.

It has already been proposed to produce synthetic resins, and particularly water-white resins, by combining phenolic and urea resins. Thus United States Patent 1,775,135 discloses the production of a resin by the combination of phenolic and urea resins which have been manufactured with the aid of an acid catalyst. I have found, however, that it is very difficult to produce technically useful products in accordance with such known process. The final resins obtained are in general too brittle to be machined easily, and as resins of this type are cast and then hardened, and not molded under heat and pressure, subsequent machining being therefore necessary, the usefulness of such resins is limited to a very considerable degree.

I have found that resins of very desirable properties, particularly as regards color, and degree of transparency, fastness to light, toughness, and machinability can be obtained by combining in novel manner two different resins, one composed of phenol and formaldehyde and the other of urea and formaldehyde, the phenol-formaldehyde resin being made in the proportion of one mol of the phenol to slightly more than one mol of formaldehyde, while the urea resin is made in any way known in the art, for example, by condensing one mol of the urea with about 2 to 4 mols or more of formaldehyde. The phenol and formaldehyde are preferably condensed separately of the urea and formaldehyde, the phenol and formaldehyde being reacted under basic conditions, while the urea and formaldehyde may be condensed either under acid or under basic conditions. In both cases the condensation is preferably carried to the viscous resin stage. The two resins, which are both in solution, are then combined and caused to interact under basic or acid conditions. Where the urea and formaldehyde have been condensed under acid conditions, the quantity of base in the phenolic resin may be so chosen that the resulting mixture is basic; or the quantity of acid in the urea formaldehyde resin may be more than equivalent to the base in the phenol-formaldehyde resin; or where the quantity of base in the phenol-formaldehyde resin is more than equivalent to the acid in the urea-formaldehyde resin, enough acid may be added to the mixture to make it acidic. If the mixture is strongly basic, the resin will generally remain in colloidal solution; if it is acidic, it may or may not remain in solution. In either event the heating is continued, preferably with agitation until the mass is homogeneous and the condensation is further advanced. If the mixture is still basic it is acidified, preferably with an organic acid, under which conditions the resin may either still remain in solution, being thus hydrophilic, or be precipitated, in which case it has been converted to the hydrophobe condition. If the resin precipitates immediately upon mixing of the two condensates, it is heated for only a short time, say about five minutes, to cause intimate mixture of the two resins; the supernatant liquid is then decanted or distilled off and the resin is further distilled under vacuum until the desired degree of transparency is obtained. For obtaining absolutely transparent products, a plasticizer may be added, such as glycerol, glycerol triacetate, methyl-phthalyl-ethyl-glycollate, and other known plasticizers.

In those cases in which the mixed resin remains in solution, the condensation is continued for about 15 to 30 minutes, after which the mass is distilled under vacuum. High vacuum is preferred, of the order, say, of 26 to 30 inches of mercury.

The resinous condensation product is opaque, translucent, or colorless, depending, among other factors, upon the degree of dehydration. The presence of moisture in the resin produces opacity, and greater degrees of water-white transparency are reached as complete dehydration is approached. When the partial condensates are acidified with inorganic acids, it is, in general, difficult to produce a transparent or even translucent product regardless of the degree of dehydration, transparent products usually requiring the use of an organic acid.

Any suitable coloring matter may be added to the resin after the distillation has begun and prior to the casting. In this way, I obtain resinous products of water-white transparency or of any desired degree of opacity, depending upon the degree of dehydration or upon the presence of additions, such products having a hitherto unattained degree of toughness, and being capable of being machined to the most complicated forms.

The transparency of my improved resins to light rays is so outstanding, and the homogeneity of the material is so complete, that lenses can be made thereof in any reasonable size, and can be hardened without danger of blowhole or fissure formation.

A further advantage of the present invention resides in the fact that, proper care being observed during the condensation, only a very small quantity of raw materials is lost, scarcely more than 10%, in the manufacture of the water-white material. In most of the known processes the loss is about 15 to 20%, and is often more when an acid catalyst is employed.

The degree of completeness to which the dehydration can be carried depends on a number of factors, in particular the quantity of basic condensating agent employed, the time allowed for condensation, the quantity of plasticizing agent present (the greater this amount is, the longer the distillation can be continued before hardening sets in, and hence the more nearly completely dehydrated the product becomes). For making transparent products, the use of organic acidifying agents is to be preferred, in fact, certain inorganic acids such as phosphoric acid, will always yield only a more or less opaque resin no matter how complete the dehydration.

In general, the larger the amount of catalyst used, or the stronger the catalyst, and the longer the condensation continues before dehydration is begun, the greater will be the degree of opacity. Better dehydration will be obtained by condensing for a shorter time, and by the use of smaller quantities of catalyst and of larger quantities of plasticizer.

The proportion of phenol and aldehyde can be varied between wide limits and yet insure satisfactory results; however, too large an excess of formaldehyde should be avoided as too much free formaldehyde unfavorably influences the final product, particularly as the free formaldehyde betrays its presence by its unpleasant odor when the material is machined. In general, not more than two mols of formaldehyde should be employed per mol of the phenol, and ordinarily less than this proportion of formaldehyde should preferably be employed. In place of all or part of the formaldehyde, other reactive methylene containing or releasing compounds, such as polymers of formaldehyde, including paraform, trioxymethylene and hexamethylenetetramine, may be employed.

The invention will be further described with the aid of the following examples which are given by way of illustration only, the invention being capable of many modifications within the scope of the appended claims without departing from the spirit and principles of the invention.

*Example 1.*—To produce an easily machinable opaque resin having a beautifully lustrous and brilliant pure white color I proceed as follows (all parts by weight):

Phenol _____ part__ 1
37% formaldehyde _____ do__ 1
NaOH based upon the weight of phenol
    _____ per cent__ 1 are condensed at the boiling temperature under reflux until a liquid resinous material is formed. There are then added 37% formaldehyde _____ part__ 1
NaOH (based on phenol) _____ per cent__ 1½ and the mixture is further condensed for a short time, after which the still liquid material is acidified with an organic acid, such as lactic, acetic or phthalic acid, the mass being further condensed in the acid medium. After about 30 minutes, the resin begins to separate from the water. The latter is decanted or syphoned off and the resin is then distilled up to about 55°–65° C. under a high vacuum. About 14% of urea, based on the phenol is then added, the condensate being still liquid at such time. The mass is stirred and the distillation is continued until the resin is viscous, whereupon it is poured and then hardened at 70°–80° C. for about two days.

The condensate in the early stages of reaction was hydrophile in nature, but was converted into a hydrophobe resin during the condensation in the acid medium. The final product represents a hardened hydrophobe resin precipitate, and contains approximately uniformly distributed therein a large number of what appear to be water droplets of a size ranging from 0.6 to about 12 microns, the droplets of 0.6–0.8 micron size representing about 70% of the total, while about 25% are of 2–3 micron size.

*Example 2*

Urea _____ gr. (1 mol)__ 30
Formaldehyde (aqueous solution)
                                gr. (4 mols)__ 162
Phenol _____ gr. (½ mol)__ 22
NaOH _____ grams__ 1.3 are condensed for 30 minutes at the boiling point under reflux. In another vessel

|  | Grams |
|---|---|
| Phenol | 200 |
| 37% formaldehyde | 255 |
| NaOH | 6 | are condensed for 30 minutes at the boiling point under reflux, the molecular proportion of phenol to formaldehyde being 1:1.55. The two condensates are then mixed together and boiled together for about 15 minutes under reflux. The mass is then acidified with lactic acid in 5–10% excess. The resin separates out immediately. The mass is distilled under only a partial vacuum so as to keep the temperature relatively high and thus maintain the resin in a fluid condition. After about one hour's distillation, the resin is poured and hardened at 70–80° for about two days. The product is slightly cloudy, but almost transparent, and can be easily turned and drilled and given a high polish.

*Example 3*

|  | Grams |
|---|---|
| Acetone | 20 |
| Phenol | 10 |
| Urea | 20 |
| Formaldehyde (37% by weight) | 250 |
| NaOH | 1.3 | are condensed for about 15 minutes under reflux at ordinary pressure, a liquid condensation product being obtained. In another vessel

|  | Grams |
|---|---|
| Phenol | 200 |
| Formaldehyde (37% by weight) | 220 |
| NaOH | 6 | are condensed for about thirty minutes under reflux.

The two condensates are then mixed together and boiled for about 30 minutes, after which the mass is acidified with lactic acid or other suitable organic acid. After some time the resin precipitates out. The layer of water can be separated by decantation or syphoning, but I prefer to distill off the water, the condensation continuing during the distillation. When all or approximately all of the visible water has been removed, 30 cc. of methyl-phthalyl-ethyl-glycollate, which is a plasticizer sold under the trade name of "Santicizer", are added and the distillation is continued under vacuum until a product of the desired viscosity is obtained. The resin is then poured into molds and hardened at about 70°–85° C. for three days, yielding a translucent, horn-like product which is easily machinable and takes on a brilliant polish.

Example 4

| | Grams |
|---|---|
| Phenol | 500 |
| Formaldehyde (37%) | 650 |
| NaOH | 15 | are boiled for 30 minutes under reflux. In a separate vessel

| | |
|---|---|
| Urea grams | 75 |
| Formaldehyde (37%) do | 303 |
| Saturated ammonium sulfide solution cc | 15 | are boiled for 15 minutes under reflux. The two condensates are then mixed together and the condensation continued for 15 minutes under the alkaline conditions. The resin separates out from the water and the mass is acidified with 50 cc. of 85% lactic acid and is distilled under high vacuum until at 65° C. a very viscous material is obtained. After curing for three days at 75 to 80° C., an opaque, brilliant white material is obtained which machines very easily.

Example 5

| | Grams |
|---|---|
| Phenol | 500 |
| Formaldehyde (37%) | 500 |
| NaOH | 5 | are condensed for 15 minutes at the boiling point under reflux. There are then added to the condensate

| | Grams |
|---|---|
| Formaldehyde | 500 |
| NaOH | 5 | and the mixture further boiled for 15 minutes. A plasticizer such as methyl-phthalyl-ethyl-glycollate (50 cc.) is then added and the boiling continued for 10 minutes under the alkaline conditions. The mass is acidified and allowed to stay over night and on cooling the resin separates from the water. The mass is distilled under a high vacuum and when a temperature of 60° C. is reached, 50 grams of urea are added. At 70° C. the mass becomes very viscous and is then poured and cured in an oven at 70 to 80° C. The urea appears to act as an accelerator of the condensation, hastening the arrival of the highly viscous state and also accelerating the final curing. Because of the accelerating action a considerable quantity of water is trapped within the body of the resin, and the result is a product which is as white as snow, is very tough and is easy to work.

Example 6

| | Grams |
|---|---|
| Formaldehyde (37%) | 220 |
| Acetone | 30 |
| Urea | 20 |
| NaOH | 1 | are condensed at the boiling point under reflux for about 30 minutes. In a separate vessel

| | Grams |
|---|---|
| Phenol | 200 |
| Formaldehyde (37%) | 220 |
| NaOH | 4 | are likewise condensed for 30 minutes under reflux. The two condensates are then mixed together and boiled for about 30 minutes. The mass is acidified with 20 cc. of lactic acid, after which 30 cc. of glycerine are added and the mass distilled under vacuum and is finally poured when it has reached a viscous state. On curing the resin for two to three days a hard, tough, and light-stable product is obtained.

Example 7

| | Grams |
|---|---|
| Phenol | 500 |
| Formaldehyde (37%) | 600 |
| NaOH | 20 | are condensed for 30 minutes under reflux. There is separately made a condensate from

| | Grams |
|---|---|
| Urea | 75 |
| Formaldehyde (37%) | 410 |
| 25% solution of ammonium sulfide | 4 | by boiling the mixture under reflux. The two condensates are then mixed and acidified, after which the mixture is further condensed and distilled under vacuum. No separation of resin takes place and there is obtained after curing, a white condensate which can be easily machined.

Example 8

| | Grams |
|---|---|
| Phenol | 200 |
| Formaldehyde (37%) | 200 |
| KOH | 4 | are condensed under reflux for 20 minutes. There are separately condensed

| | |
|---|---|
| Urea grams | 40 |
| Formaldehyde (37%) do | 270 |
| Concentrated ammonium sulfide solution cc | 5 | for about 15 minutes. The two condensates are mixed and boiled for 15 minutes after which the mass is acidified with 20 cc. of lactic acid. After the addition of 30 cc. of glycerine the mass is distilled under high vacuum until completely dehydrated. Upon pouring and curing the viscous liquid so obtained, a clear and machinable resin is produced.

Example 9

| | Grams |
|---|---|
| Phenol | 500 |
| Formaldehyde (37%) | 500 |
| KOH | 25 | are condensed for 20 minutes at the boiling point, a clear solution being obtained. The mass is acidified with 75 cc. of lactic acid and there are then added

| | Grams |
|---|---|
| Urea | 100 |
| Formaldehyde (37%) | 540 | and the mixture further condensed for 40 minutes at approximately the boiling point in the acid medium. Upon allowing the mixture to cool, it becomes turbid and separates into two layers, indicating that the resin is in the hydrophobe condition. The mass is then carefully distilled under high vacuum and after the major portion of the water has been removed it turns clear. A plasticizer such as methyl-phthalyl-ethyl-glycollate (50 cc.) is then added and the distillation continued under vacuum until the mass becomes very viscous. It is then poured and cured for about three days at 75°–80° C., yielding a hard, white opaque material which can be subjected to the usual machine operations.

Example 10

| | Grams |
|---|---|
| Phenol | 500 |
| Formaldehyde (40%) | 500 |
| NaOH | 15 | are condensed at the boiling point for thirty minutes. In a separate kettle

| | | Grams |
|---|---|---|
| Urea | grams | 75 |
| Formaldehyde (40%) | do | 404 |
| NH₃ (28%) | cc | 6 | are condensed for 12 minutes, both resins then being mixed together and acidified with a slight excess of lactic acid, after which the mixture is condensed for about 35 minutes at approximately the boiling point in the acid medium. The mass separates rapidly into two layers. 80 cc. of glycerine are added and the mixture distilled under high vacuum until it becomes highly viscous. It is then poured and hardened for about three days at 75°–80° C., there being obtained a slightly translucent horn-like material having very satisfactory working qualities.

Example 11

| | Grams |
|---|---|
| Phenol | 500 |
| Formaldehyde (40%) | 500 |
| KOH | 15 | are condensed for 20 minutes under reflux. To the product there are added

| | Grams |
|---|---|
| Urea | 100 |
| Formaldehyde (40%) | 540 | and the mixture condensed for 15 minutes under alkaline conditions. It is then acidified with 50 cc. lactic acid and further condensed for 10 minutes in the acid medium. The mixture is slightly cooled, whereupon a hydrophobe resin separates out. 100 cc. of glycerin or other plasticizer are added and the mixture distilled with stirring under a high vacuum. The resin is then cast and hardened for three days at 75°–80° C., resulting in an almost completely transparent material which can be worked very easily.

Example 12

| | Grams |
|---|---|
| Phenol | 100 |
| Formaldehyde (36% water solution) | 160 |
| 25% NaOH solution | 8 | are condensed for about 15 minutes at boiling temperature.

In a separate vessel

| | | Grams |
|---|---|---|
| Urea | | 15 |
| Formaldehyde (36% water solution) | | 60 | are condensed with 4 cc. of concentrated ammonium sulfide solution ((NH₄)₂S), likewise for about fifteen minutes and at boiling temperature. The two condensates are then mixed and heated together for about 20 minutes, and thereby further condensed under alkaline conditions. The mass is then acidified with 7 grams of 85% lactic acid solution and then distilled under vacuum, until the mass is substantially completely dehydrated. The addition of about 10 to 15 cc. of glycerine or an equivalent amount of any other suitable plasticizing agent of high boiling point, such as triacetin, facilitates the distillation to complete dehydration. The still liquid mass is then hardened in an oven at a temperature from 70° to 80° C. for three to five days. The product so obtained is of a water-white transparency, is stable in character, and is characterized in particular by an unusual degree of toughness and machinability for this type of resin.

Example 13

| | Grams |
|---|---|
| Phenol | 100 |
| Formaldehyde (36% solution) | 160 |
| 30% K₂CO₃ solution | 10 | are condensed for about 40 minutes at boiling temperature.

| | | Grams |
|---|---|---|
| Urea | grams | 15 |
| Formaldehyde (36%) | do | 60 |
| 10% ammonia solution | cc | 4 | are separately condensed for about 20 minutes at boiling temperature.

The two condensates are then mixed with 6 grams of 85% lactic acid and 12 cc. of amyl acetate are added. The mass is thereby rendered slightly acid and is then distilled under vacuum until practically completely dehydrated. The viscous mass is then hardened as indicated in Example 12, and yields a clear, colorless mass, similar in properties to that of Example 12.

Example 14

| | Grams |
|---|---|
| Phenol | 100 |
| Formaldehyde (36%) | 140 |
| 25% KOH solution | 10 | are condensed for about 50 minutes at boiling temperature.

| | | Grams |
|---|---|---|
| Urea | grams | 15 |
| Formaldehyde (36%) | do | 75 |
| Saturated ammonium sulfide solution | cc | 5 | are condensed in a separate vessel for about 20 minutes at the boiling temperature. After mixing the two condensates, 6 grams of 85% lactic acid solution and 6 cc. of glycerine are added, and the mass then distilled to such an extent that after three days of hardening, a translucent material is obtained. The product is characterized by an extraordinary degree of toughness.

Example 15

| | Grams |
|---|---|
| Phenol | 100 |
| Formaldehyde (36%) | 130 |
| 25% NaOH solution | 10 | are condensed for 30 minutes at the boiling point.

| | Grams |
|---|---|
| Urea | 15 |
| Formaldehyde (36%) | 90 | are condensed with pyridine in an amount equivalent to 5 cc. of saturated ammonium sulfide solution for 20 minutes at boiling temperature. The two condensates are then mixed and further condensed at boiling temperature in the alkaline medium for about 15 minutes and acidified with 6 grams of glacial acetic acid. The mass is then distilled under vacuum to only partial dehydration. After three days of hardening at a temperature of 70°-80° C. there is obtained a white, opaque material of very high strength.

*Example 16*

| | Grams |
|---|---|
| Phenol | 100 |
| Formaldehyde (36%) | 120 |
| 25% NaOH solution | 4 | are condensed for about 20 minutes at boiling temperature. In a separate vessel,

| | |
|---|---|
| Urea grams | 12 |
| Formaldehyde (36%) do | 100 |
| Saturated ammonium sulfide solution cc | 5 | are condensed at the boiling temperature for about 15 minutes. The two condensates are then mixed, and after adding about 6 cc. of a 25% NaOH solution the mass is further condensed for about 25 minutes. There are then added 8 grams of 85% lactic acid and 5 cc. of glycerine, and the mass distilled. After heating for 4 days at about 75°-80° C. there is obtained a translucent mass characterized by an unusual degree of toughness and machinability.

*Example 17*

| | Grams |
|---|---|
| Phenol | 100 |
| Formaldehyde (36%) | 140 |
| 25% NaOH solution | 12 | are condensed for about 30 minutes at boiling temperature. The condensate is then neutralized with about 8 grams of phosphoric acid. In a separate vessel 15 grams of urea and 70 grams of formaldehyde (36%) are condensed at boiling temperature for about 30 minutes with 3 grams of lactic acid. The two condensates are mixed together and then distilled to remove at least most of the water. A white opaque material which is easily workable is attained after 3 to 4 days of hardening at 70°-80° C.

*Example 18*

| | Grams |
|---|---|
| Phenol | 100 |
| Formaldehyde (36%) | 160 |
| 25% KOH solution | 10 | are condensed for about 35 minutes at boiling temperature. In a separate vessel 60 grams formaldehyde are heated to the boiling point and there are then added 15 grams of urea in three portions. After each addition a strong reaction takes place. The boiling is continued until gelatinisation begins, then both condensates are mixed together and acidified with 6 grams of lactic acid. 12 grams of glycerine are added and the mixture dehydrated as far as possible. After hardening for 4 to 5 days at 70°-80° C. a clear colorless product like that of Example 12 is obtained.

The ordinary phenol employed in the above examples may be replaced by other phenols, such as cresol and the higher homologues, but it is usually more difficult to obtain transparent resins with the higher phenols. Thiourea can be used in place of urea, but the condensation will require a longer time. Other substituted ureas employed in the art may be used, but they will usually yield a more or less opaque product.

The proportion of phenolic resin to urea resin can be varied within rather wide limits, the particular proportion depending in large measure upon the properties desired for the final product. While I prefer to acidify the mixture of condensates with an organic acid, as I have found that such acids generally yield better results, in certain instances inorganic acids may be employed, for instance phosphoric acid in making opaque products.

If desired, condensation in the alkaline medium can be completed before the condensates are mixed, the condensates being acidified immediately after mixing.

The amount of catalyst employed for the initial phenolic condensation when transparent products are to be produced is preferably about 1% to 3% by weight of the phenol in the case of NaOH. For opaque resins, the weight of catalyst should be at least 2% by weight of the phenol in the case of NaOH, while other catalysts may be used in equivalent amounts. Equivalent amounts of KOH and $K_2CO_3$ may be used. Alkaline reacting salts may in general be used, including sodium phosphate ($Na_3PO_4$), sodium acetate, sodium sulfide, sodium sulfite, ammonium sulfide, the corresponding potassium salts, and other alkali metal salts of weak acids. Various amines may also be used. For producing transparent resins, the hydroxide, carbonate and acetate of sodium and potassium are preferred; on the other hand, sodium sulfide and sulfite yield only opaque resins.

In the case of the urea condensate, the specific amount of catalyst is not of critical importance. The amount will usually be governed by the speed of reaction desired, while if desired, the use of a catalyst can be dispensed with entirely.

It will be understood that any suitable additions, such as dyes, pigments, opacifying agents, plasticizing agents, etc., may be added to the resin at any stage in the condensation, as is well known to those skilled in the art, to modify the color or other physical property of the final product. It is, however, preferable not to add the plasticizer at the beginning of the condensation.

I claim:

1. The method of producing cast, machinable resins which comprises partially condensing a phenol and formaldehyde in the presence of an alkaline reacting catalyst, separately partially condensing a urea and formaldehyde in the presence of an alkaline reacting catalyst, mixing the two condensates, further condensing the mass in the alkaline medium, acidifying the mass, continuing the condensation in the acid medium, the degree of reaction in the alkaline medium and the degree of acidification being so related that the resin separates out on cooling, distilling off water from the hydrophobic resin, casting the still liquid resin, and then hardening the mass.

2. The method of producing cast, machinable resins, which comprises partially condensing approximately 1 mol of phenol and 1 to 2 mols of formaldehyde in the presence of an alkali metal base, separately partially condensing approximately one mol of a urea and 2 to 4 mols of formaldehyde with the aid of an alkaline catalyst, combining the two condensates, acidifying the same, further condensing the mass in the acid medium until a hydrophobe resin separates out, distilling off water, casting the still liquid resin, and then hardening the mass.

3. The method of producing cast, machinable resins, which comprises partially condensing phenol and formaldehyde in the presence of an alkaline reacting catalyst, separately partially condensing urea and formaldehyde, mixing and acidifying the condensates in any order, the acidification being effected with such a quantity of organic acid that a hydrophobe resin precipitates out, continuing the condensation in the acid medium, distilling off water, casting the still liquid resin, and then hardening the mass.

4. The method of producing transparent, machinable resins, which comprises partially condensing phenol and formaldehyde in the presence of an alkaline catalyst, separately partially condensing urea and formaldehyde, mixing and acidifying the condensates with an organic acid and adding a plasticizing agent in any order, continuing the condensation and substantially completely dehydrating the mass, casting the still liquid resin, and then hardening the mass.

5. The method of producing lustrous white opaque synthetic resins, which comprises condensing approximately 500 grams of phenol, 650 grams of 37% formaldehyde and 15 grams of sodium hydroxide under reflux until a liquid condensate is obtained, separately condensing approximately 75 grams of urea, 303 grams of 37% formaldehyde, and 15 cc. of saturated ammonium sulfide solution under reflux, mixing the two condensates and continuing the condensation under the alkaline conditions whereupon a hydrophobe resin separates out, acidifying the mass with lactic acid and distilling the same under vacuum until a viscous material is obtained, and then pouring and curing the mass.

6. A cast, tough, machinable resin obtained by the mixing of a phenol-formaldehyde and a urea-formaldehyde condensate each produced separately, prior to the mixing, under alkaline conditions followed by final condensation of the mixture under acid conditions, said resin being white in color due to the dispersion therein of microscopic particles of water.

7. A cast, tough, easily machinable resin, comprising a hydrophobe mixture of a phenol-formaldehyde resin produced under alkaline conditions and a separately formed urea formaldehyde condensate, the phenol resin being hydrophilic during the alkaline condensation and comprising more than half of the mixture, said resin having been hardened under acid conditions.

8. A substantially transparent, cast, machinable resin obtained by the mixing of a phenol-formaldehyde and a urea-formaldehyde condensate each produced separately prior to the mixing, in the presence of a basic alkali metal compound and followed by final hardening of the mixture in the presence of free organic acid.

9. The method of producing tough, easily machinable resins which comprises partially condensing a phenol and formaldehyde in the presence of an alkaline reacting catalyst, separately partially condensing a urea and formaldehyde in the presence of an alkaline reacting catalyst, mixing the two condensates, subsequently further condensing the mixture in an acid medium, removing water from the mass, casting the still liquid resin, and then hardening the mass.

10. The method of producing tough, easily machinable resins, which comprises partially condensing a phenol and formaldehyde in the presence of an alkaline reacting catalyst, separately partially condensing urea and formaldehyde in the presence of an alkaline reacting catalyst, mixing the two condensates, further condensing the mass in the alkaline medium, acidifying the mass, continuing the condensation in the acid medium, casting the still liquid resin, and then hardening the mass.

11. The method of producing tough and easily machinable resins, which comprises partially condensing approximately 1 mol of a phenol and 1 to 2 mols formaldehyde in the presence of an alkali metal base, separately partially condensing approximately one mol of a urea and 2 to 4 mols of formaldehyde with the aid of an alkaline catalyst, combining the two condensates, acidifying the same, further condensing the mass in the acid medium, casting the still liquid resin, and then hardening the mass.

12. The method of producing tough, easily machinable resins, which comprises partially condensing a phenol and formaldehyde in presence of an alkaline reacting catalyst, separately partially condensing urea and formaldehyde in the presence of an alkaline reacting catalyst, mixing and acidifying the condensates in any order, and continuing the condensation in the acid medium, casting the still liquid resin, and then hardening the mass.

13. The method of producing tough, easily machinable resins, which comprises partially condensing a phenol and formaldehyde in the presence of an alkaline reacting catalyst, separately partially condensing urea and formaldehyde in the presence of ammonium sulfide, mixing and acidifying the condensates in any order, and continuing the condensation in the acid medium, casting the still liquid resin, and then hardening the mass.

14. The method of producing tough, easily machinable resins, which comprises partially condensing phenol and formaldehyde in the presence of an alkali metal base, separately partially condensing urea and formaldehyde in the presence of ammonium sulfide, mixing and acidifying the condensates in either order, continuing the condensation, at least partially dehydrating the mixture, casting the still liquid resin, then hardening the mass.

15. The method according to claim 9, wherein the condensates are acidified with an organic acid.

16. The method according to claim 11, wherein the mixture of condensates is acidified with an organic acid.

17. The method according to claim 9, wherein the condensates are acidified with lactic acid.

18. The method of producing water-white, transparent, easily machinable resins, which comprises partially condensing a phenol and formaldehyde in the presence of an alkaline catalyst, separately partially condensing urea and formaldehyde in the presence of an alkaline catalyst, mixing and acidifying the condensates with an organic acid and adding a plasticizing agent in any order, continuing the condensation and substantially completely dehydrating the mass, casting the still liquid resin, and then hardening the mass.

19. The method of producing water-white, transparent, easily machinable resins, which comprises partially condensing phenol and formaldehyde in the presence of an alkali-metal base, separately partially condensing urea and formaldehyde in the presence of ammonium sulfide, mixing and acidifying the condensates with an organic acid and adding a plasticizing agent in any order, continuing the condensation and substantially completely dehydrating the mass, casting the still liquid resin, and then hardening the mass.

20. The method of producing water-white, transparent, easily machinable resins, which comprises partially condensing phenol and formaldehyde in the presence of an alkali metal base, separately partially reacting urea and formaldehyde in the presence of a member of the group of weak alkaline catalysts consisting of ammonia and ammonium sulfide, mixing the condensates, continuing the condensation, acidifying the mixture with an organic acid and adding a plasticizing agent in any order, distilling the mass until the same is substantially completely dehydrated, casting the still liquid resin, and then hardening the mass.

21. The method as set forth in claim 18, wherein the condensates are acidified with lactic acid.

22. A cast, tough, easily machinable resin produced in accordance with the method set forth in claim 9.

23. A cast, tough, easily machinable, water-white transparent resin produced in accordance with the method set forth in claim 18.

24. The method of producing tough, easily machinable resins, which comprises partially condensing a phenol and formaldehyde in the presence of a basic catalyst, separately partially condensing a urea and formaldehyde, mixing and acidifying the condensation products in either order, further heating the mixture to condense the same, casting the still liquid resin, and then hardening the product.

25. The method of producing tough, easily machinable resins which comprises condensing a phenol and formaldehyde in the presence of a basic catalyst, separately condensing a urea and formaldehyde, mixing and acidifying the two condensates in any order, casting the still liquid resin, and then hardening the mass.

26. The method of producing tough, easily machinable resins which comprises partially condensing phenol and formaldehyde in the presence of an alkaline reacting catalyst, separately partially condensing urea and formaldehyde, mixing and acidifying the two condensates in any order, at least partially dehydrating the mixture, casting the still liquid resin, and then hardening the mass.

27. The method according to claim 25, wherein the phenol resin preponderates over the urea resin.

KARL LOOS.